United States Patent
Jeschke et al.

(10) Patent No.: US 6,782,270 B1
(45) Date of Patent: Aug. 24, 2004

(54) TRANSMIT POWER CONTROL IN A MOBILE COMMUNICATIONS SYSTEM

(75) Inventors: Michael Jeschke, Stuttgart (DE); Ivar Mortensen, Korntal (DE)

(73) Assignee: Alcatel, Paris (FR)

(*) Notice: Subject to any disclaimer, the term of this patent is extended or adjusted under 35 U.S.C. 154(b) by 678 days.

(21) Appl. No.: 09/313,359

(22) Filed: May 18, 1999

(30) Foreign Application Priority Data

Mar. 29, 1999 (EP) .............................. 99106365

(51) Int. Cl.$^7$ .............................. H04B 7/00; H04Q 7/20
(52) U.S. Cl. .................... 455/522; 455/69; 455/561
(58) Field of Search ...................... 455/69, 522, 560, 455/561; 370/328, 335, 337

(56) References Cited

U.S. PATENT DOCUMENTS

| | | | |
|---|---|---|---|
| 5,933,782 A | * | 8/1999 | Nakano ..................... 455/522 |
| 6,181,919 B1 | * | 1/2001 | Ozluturk ..................... 455/69 |
| 6,212,399 B1 | * | 4/2001 | Kumar ....................... 455/522 |

FOREIGN PATENT DOCUMENTS

| | | |
|---|---|---|
| WO | WO 97/17769 | 5/1997 |
| WO | WO 98/56200 | 12/1998 |

OTHER PUBLICATIONS

Michel Mouly et al.: "GSM—The System for Mobile Communications" The GSM System for Mobile Communications, Seiten 190, 342–346, XP002101339.

* cited by examiner

Primary Examiner—Marsha D. Banks-Harold
Assistant Examiner—J. Moore
(74) Attorney, Agent, or Firm—Sughrue Mion PLLC

(57) ABSTRACT

In a UMTS (Universal Mobile Telecommunications System) wherein multiple base stations are able to communicate simultaneously with the same mobile station, with forward direction power control where the mobile station sends a transmit power control command to all base stations serving it, each base station is assigned an individual target value (TV1) from which the transmitted power level should not deviate on a long term average, thereby achieving high macrodiversity gain even under poor receiving conditions.

10 Claims, 3 Drawing Sheets

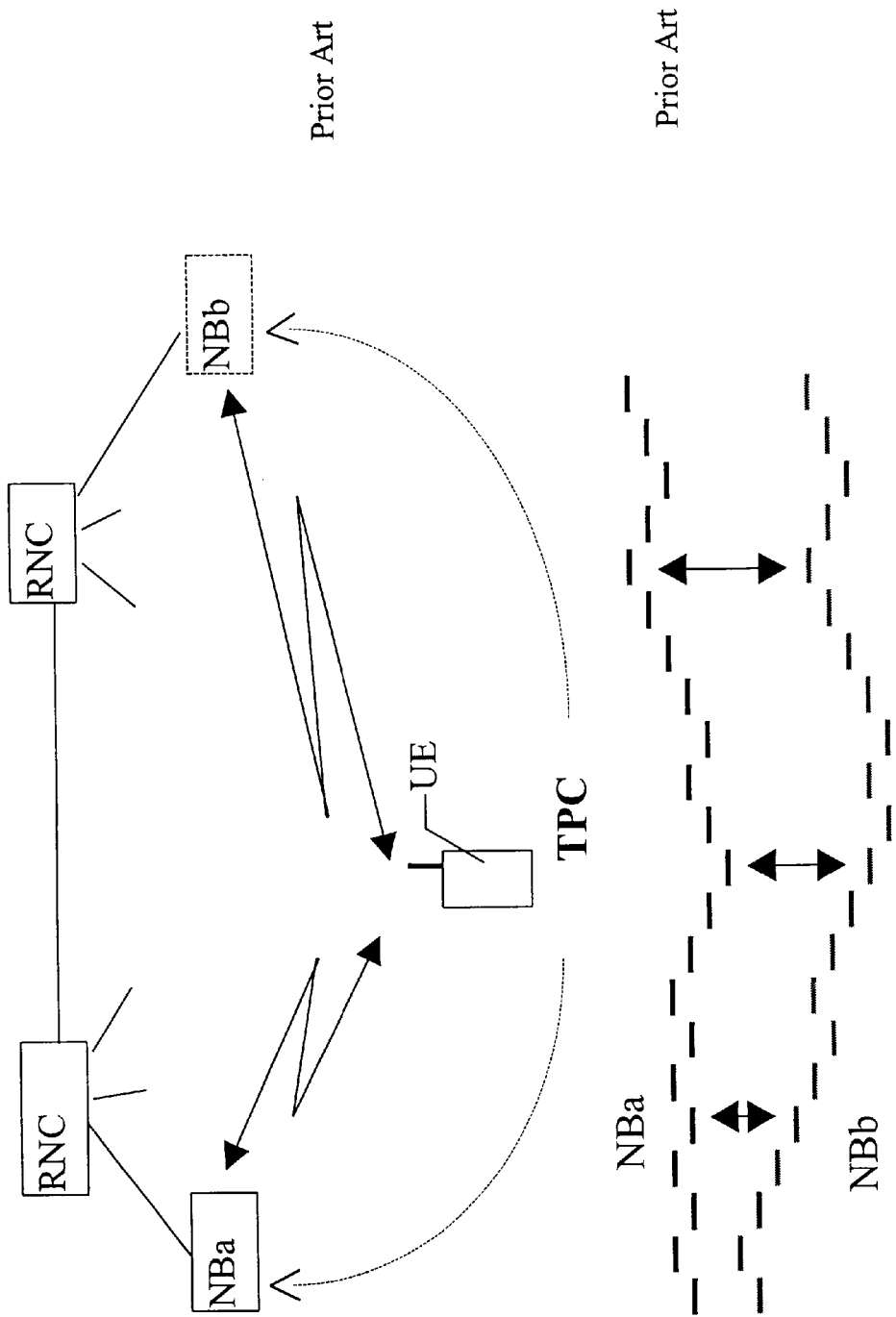

TRANSMIT POWER CONTROL IN A MOBILE COMMUNICATIONS SYSTEM

BACKGROUND OF THE INVENTION

Conventional mobile communications systems, particularly cellular systems, contain a number of base stations which communicate with mobile stations. If at least two base stations communicate simultaneously with the same mobile station, so-called macrodiversity transmission takes place. This mode of transmission is used, for example, in code division multiple access (CDMA) mobile communications systems. In the planned mobile communications system UMTS (universal mobile telecommunications system), macrodiversity transmission is to be used at least during handoff of the mobile station from one base station to another. In the UMTS, the powers transmitted by the base stations must be adapted as quickly as possible to changes in channel characteristics, which are caused by fading, for example. The mobile station sends to all base stations serving it a transmit power control (TPC) command instructing them to change their transmitted powers, namely to raise or lower the transmitted power level by a predetermined amount of, e.g., 1 dB.

SUMMARY OF THE INVENTION

The invention is predicated on recognition that the following problem arises if TPC commands are detected in error. If one of the base stations receives the TPC command incorrectly, it will change its transmitted power incorrectly as compared with those base stations which receive the TPC command correctly. This means that this individual base station will change its transmitted power in the opposite sense to the other base stations. Accordingly, the transmitted power levels will drift apart ("random walk"). This drift reduces the desired macrodiversity gain. To prevent this drift, the invention proposes to preset for each base station an individual target value from which the transmitted power level should not deviate on a longterm average. Each base station changes its transmitted power in the direction of the target value assigned to it. Thus, in addition to the known power control loop, a further control loop is proposed which is traversed taking into account an externally preset target value. By this measure, a high macrodiversity gain is achieved even under poor receiving conditions. This second control loop can be traversed independently of the reception of the command.

BRIEF DESCRIPTION OF THE DRAWINGS

The invention and its advantages will become more apparent from the following description of an embodiment when taken in conjunction with the accompanying schematic drawings, in which:

FIG. 1a shows the structure of a conventional mobile communications system;

FIG. 1b shows the time variation of the transmitted power levels and the conventionally occurring drift;

SUMMARY OF THE INVENTION

FIG. 1a shows a conventional mobile communications system with at least two base stations NBa and NBb which are interconnected via a control network and are communicating with a mobile station UE. The control network contains radio network controllers RNC via which the base stations are connected with one another and with telecommunications networks, such as the public switched telephone network (PSTN). FIG. 1a shows a macrodiversity situation, in which the two base stations NBa and NBb communicate with the mobile station UE simultaneously. To control the transmitted powers in the individual base stations, the mobile station UE sends a uniform command, the TPC command, to the two base stations NBa and NBb at regular intervals. The two base stations evaluate the received TPC command and change their transmitted powers. The TPC command indicates whether the transmitted power is to be increased or reduced. Only if both base stations receive the TPC command correctly will they change their transmitted powers in the same sense.

FIG. 1b shows the time variation of the transmitted power levels for the two base stations NBa and NBb if an incorrect reception of the TPC command occurs from time to time. As the transmitted powers do not change in the same sense, the two transmitted power levels gradually drift apart.

Figures 2A, 2B:
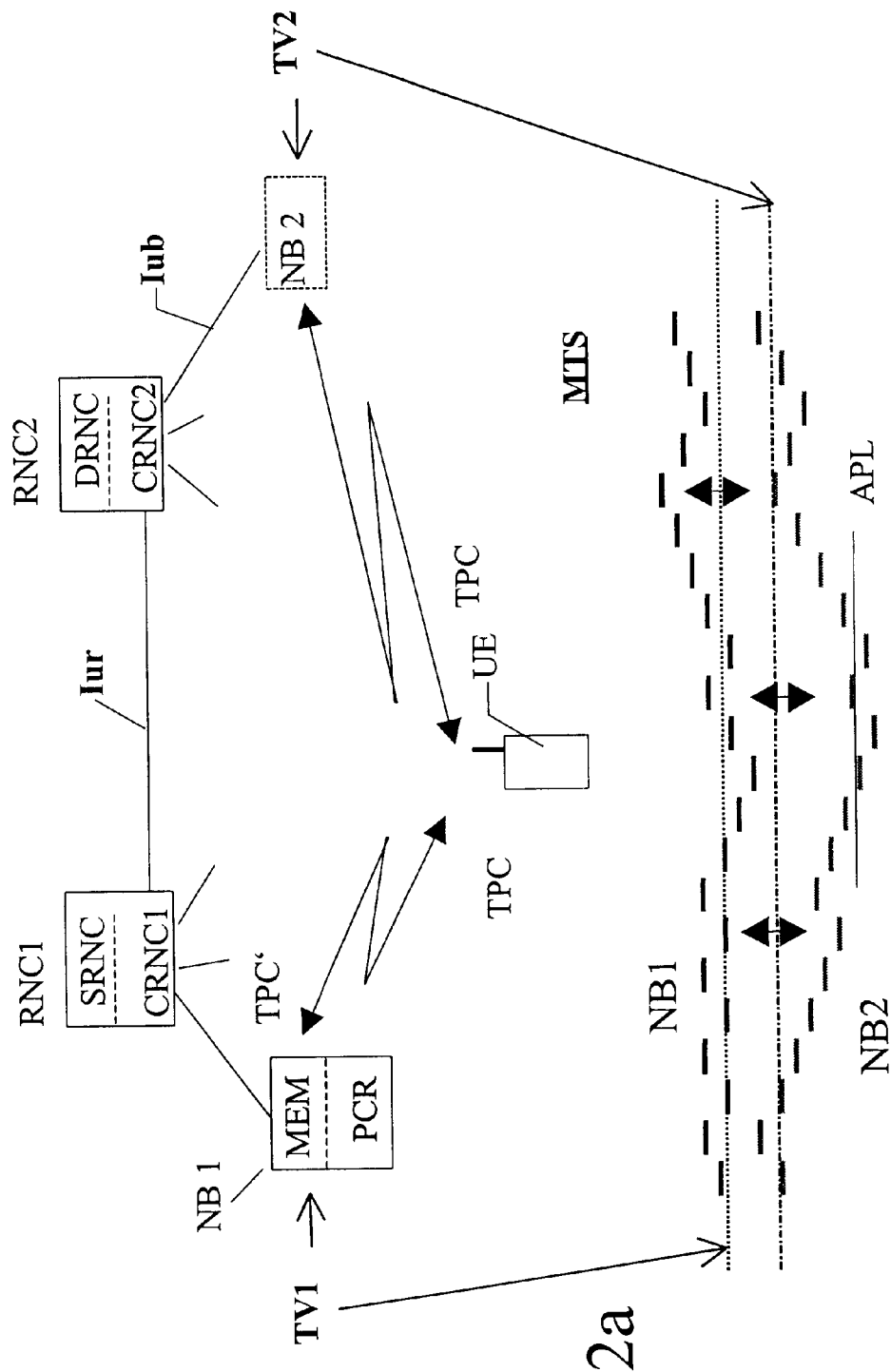
FIG. 2a shows the structure of a mobile communications system in accordance with the invention.
FIG. 2b shows the time variation of the transmitted power levels as is caused by a method in accordance with the invention.

FIG. 2a shows the structure of a mobile communications system MTS according to the invention, in which this problem does not arise. The mobile communications system contains a number of base stations, of which only two, NB1 and NB2, are shown. These two base stations NB1 and NB2 are interconnected via a control network and communicate simultaneously, at least temporarily, with a mobile station. UE. This means that, at least temporarily, macrodiversity transmission takes place. The control network contains two radio network controllers RNC1 and RNC2 which interconnect the base stations NB1 and NB2, and one of which, RNC1, establishes a connection to a telecommunications network (not shown). Each of these radio network controllers RNC1 and RNC2 can be divided into two functional units. The first radio network controller RNC1 has a first base station controller SRNC, which controls the above-mentioned macrodiversity transmission. The second radio network controller RNC2 has a second base station controller DRNC, which supports the first base station controller SRNC. Accordingly, these base station controllers SRNC and DRNC control functions relating to the macrodiversity for the mobile station UE.

In addition, the two radio network controllers RNC1 and RNC2 comprise further base station controllers CRNC1 and CRNC2, respectively, which are essentially designed to monitor the radio transmissions from the base stations connected thereto, for example to provide radio resource management functions, and not to provide macrodiversity control functions.

Signaling between the two radio network controllers RNC1 and RNC2 is effected via a first interface Iur. Signaling between the radio network controller RNC1 and the base station NB1 and between the radio network controller RNC2 and the base station NB2 is effected via respective second interfaces Iub. The interfaces Iur and Iub will be described in more detail below.

Each of the two base stations NB1 and NB2 changes its transmitted power using the method according to the invention, in which target values TV1 and TV2 are preset by the first based station controller SRNC for the base stations NB1 and NB2, respectively. The method will now be described in more detail with reference to FIG. 3 and FIG. 2b, which illustrates the effect of the method.

FIG. 2b shows the time variation of the transmitted power levels, which, as a result of the measures according to the invention, do not drift apart but stay in the vicinity of the target values TV1 and TV2 assigned to the base stations NB1 and NB2, respectively. The representation in FIG. 2b is based on the same error pattern in the reception of the TPC commands as the representation in FIG. 1b. A comparison of the two figures clearly shows the improvement obtained by presetting the target values.

Figure 3:
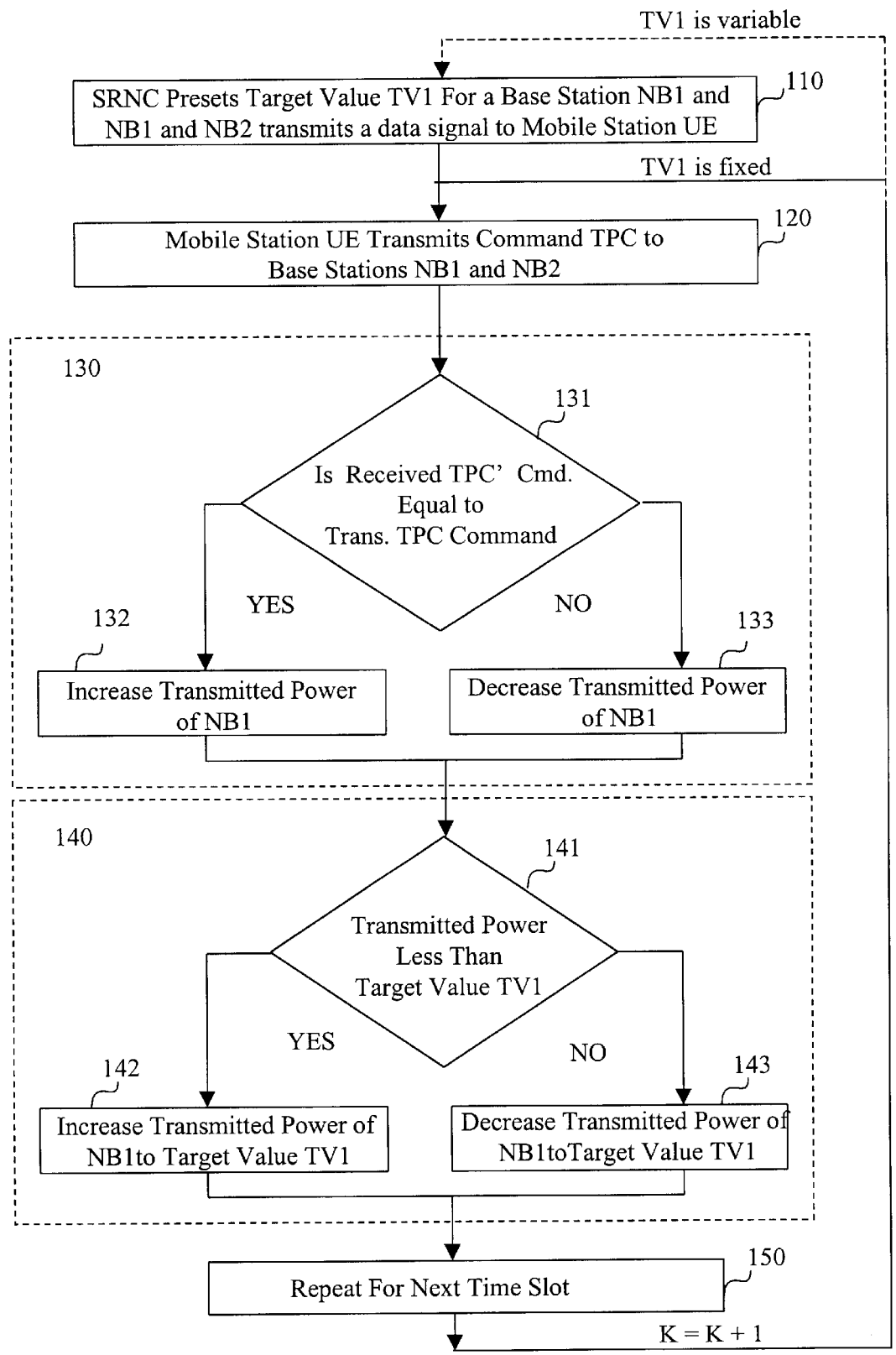
FIG. 3 is a flowchart showing the steps of the method in accordance with the invention.

FIG. 3 is a flowchart showing the steps of a method 100 for changing the transmitted power of a base station. The term "transmitted power" as used herein means the power required in the forward direction to provide radio services over macrodiversity channels. The radio services used by a single mobile station are considered here, with the transmitted power relating to a cell which is served by one of the base stations.

The method 100 relates to the change in the power transmitted by the base station NB1 of FIG. 2a, and comprises steps 110 to 150. Transmission is time-division multiplex, and the implementation of the method 100 is considered here for the duration of two time slots k and k+1.

In a first step 110, the base station controller SRNC presets a target value TV1 for the base station NB1. The target value TV1 can be fixed or variable, and is stored in a memory MEM which is accessed by a transmit power controller PCR (see FIG. 2a).

In time slot k, the two base stations NB1 and NB2 transmit a user data signal simultaneously to the mobile station UE. The base station NB1 transmits this signal with a power of, e.g., 20 dBm, and the base station NB2 with a power of, e.g., 18 dBm.

In a step 120, a command TPC is transmitted from the mobile station UE to the two base stations NB1 and NB2 to indicate to the latter that their transmitted powers have to be changed. In this example, the mobile station wants an increase in transmitted power for the next time slot k+1.

In a step 130, the change in transmitted power is executed in the conventional manner, which will now be described by the example of the base station NB1. In a partial step 131, the base station NB1 evaluates the command TPC' received by it. If the base station NB1 has received the command correctly, i.e., if the received command TPC' is equal to the transmitted command TPC, it determines that the transmitted power must be increased, and goes to a partial step 132, in which it increases the transmitted power by a fixed amount of 1 dB. If the command is received in error (TPC' not equal to TPC), in a step: 133 the transmitted power—contrary to the wish of the mobile station will be decreased. This decrease amounts to −1 dB. Thus, in step 130, the transmitted power is changed solely by taking account of the received command TPC'.

This is followed by a step 140, in which the base station NB1 additionally changes its transmitted power by taking into account the target value TV1 assigned to it. To do this, the base station NB1 checks in a step 141 whether the transmitted power level of 20 dBm, last used in time slot k, is less than or greater than the target value TV1. Here the target value TV1 is 17 dBm. Then, the transmitted power is slightly increased in partial step 142 or slightly decreased in partial step 143 in order to approach the target value. In this example, the transmitted power level is greater than the target value TV1, so that partial step 143 is carried out.

Compared to the above-described change in transmitted power according to step 130, this additional change according to step 140 is smaller and amounts to only ±0.2 dB. This amount of change is variable and preferably is particularly large if the deviation of the transmitted power level from the preset target value is large. For example, the amount of change is ±0.5 dB if the transmitted power level deviates from the target value by more than 7 dB. The amount of change is determined by the base station. The target value is preset by the first base station controller SRNC.

The base station controller SRNC shown in FIG. 2a calculates the target value TV2 for the base station NB2, for example. The calculation,can be based on different criteria:

Path loss in the forward direction.

Traffic load in the cell of NB2 in the forward direction. This is determined by the base station NB2 or by the base station controller connected thereto, CRNC2, and is communicated to the base station controller SRNC.

The transmitted power averaged over a prolonged period of time (see continuous line in FIG. 2b). This average transmitted power APL is communicated by the base station NB2 to the first base station controller SRNC.

The target value TV2 can be communicated by the base station controller SRNC to the base station NB2 in the form of:

an absolute value in dBm or in watts, or a relative value in dB.

The relative value can relate to the total power transmitted by the base station NB2. The relative value can also relate to a reference value which is determined by the power transmitted by the base station NB2 for all user data channels in the cell less the transmitted power for the common channels, such as the broadcast signaling channel or the paging broadcast channel. In the two latter cases it is necessary for the base station NB2 to average the time-varying reference value over an adequate period of time and to regularly communicate this average reference value to the base station controller SRNC.

Preferably, immediately after the establishment of communication between the mobile station UE and the base station NB2, the latter transmits the user data radio signals at an initial power which corresponds to the target value TV2 assigned to this base station NB2.

Moreover, each of the base stations determines a permissible transmit level range based on the target value communicated to it. The target value preferably lies in the middle of the transmit level range. The amplitude span of this range has a predetermined value of 15 dB.

It is conceivable that the first base station controller communicates values for a permissible transmit level range to each of the base stations, and that each of the base stations then determines its target value based on the values communicated to it.

The method described can be used to advantage for transmission in the so-called SSDT mode (SSDT=site selection diversity transmit power control), which is known per se from the standardization of the UMTS:

In the SSDT mode, a base station involved in a macrodiversity transmission transmits the control part of the signals with a first power level (power P1). The data part is transmitted with this power level (P1) only if the base station serves a so-called primary cell. If the status is changed and a so-called non-primary cell is served, the data part is transmitted with a second, lower power level (P2<P1), which can also be zero (P2=0). In the SSDT mode, the invention can be applied to any base station by regarding the target value communicated to it as the preset value for the first transmitted power level (P1).

What is claimed is:

1. A method (100) of changing the powers transmitted by at least two base stations (NB1, NB2) communicating simultaneously, at least temporarily, with a mobile station (UE) in a mobile communications system (MTS), said method (100) comprising the steps of: sending from the mobile station (UE) to the base,stations (NB1, NB2) a command (TPC) instructing the base stations (NB1, NB2) to change their transmitted powers (120); changing the transmitted power in each (NB1) of the base stations in response to the command (TPC) (130); and additionally changing the transmitted power in each (NB1) of the base stations continuously in the direction of a presettable target value (TV1) (140).

2. A method (100) as claimed in claim 1, comprising determining the target values (TV1, TV2) in a base station controller (SRNC) and communicating them to the base stations (NB1, NB2) (110).

3. A method as claimed in claim 2, comprising averaging the transmitted power over a period of time in the base station (NB1) and continuously communicating the average transmitted power (APL) to the base station controller (SRNC) to determine the target value (TV1) therefrom.

4. A method as claimed in claim 2, comprising determining a permissible transmit level range in each (NB1) of the base stations based on the target value (TV1) communicated to the respective base station (NB1).

5. A method (100) as claimed in claim 2, comprising calculating the target value (TV1) for each (NB1) of the base stations in the base station controller (SRNC) based on a value specifying the traffic carried by the base station (NB1) in the forward direction, said value being determined by the base station (NB1) and communicated to the base station controller (SRNC).

6. A method as claimed in claim 1, comprising transmitting, immediately after establishment of communication between the mobile station (UE) and one (NB2) of the base stations, radio signals from said one base station (NB2) at an initial power corresponding to the target value (TV2) for said one base station (NB2).

7. A method as claimed in claim 1, comprising communicating values for a permissible transmit level range from a base station controller to each of the base stations, and determining the respective target value in each of the base stations based on the values communicated to the respective base station.

8. A method as claimed in claim 1, comprising determining the target values (TV1, TV2) in a first base station controller (SRNC) and communicating them to the base stations (NB1, NB2) (110), the target value (TV2) for each (NB2) of the base stations being calculated in the first base station controller (SRNC) based on a value specifying the traffic carried by the base station (NB2) in the forward direction, said value being determined by a second base station controller (CRNC2), which is connected directly to said base station (NB2), and being communicated to the first base station controller (SRNC).

9. A base station (NB1) for a mobile communications system (MTS), said base station (NB1) receiving from a mobile station (UE) a command (TPC) instructing it to change its transmitted power, and comprising: a memory (MEM) containing a presettable target value for the transmitted power; and a transmit power controller (PCR) connected to the memory (MEM) for changing the transmitted power of the base station (NB1) in response to the command and for additionally changing the transmitted power continuously in the direction of the presettable target value (TV1).

10. A mobile communications system (MTS) comprising at least two base stations (NB1, NB2) communicating simultaneously, at least temporarily, with a mobile station (UE), the mobile station (UE) sending to the base stations (NB1, NB2) a command (TPC) instructing the base stations (NB1, NB2) to change their transmitted powers, each (NB1) of the base stations comprising: a memory (MEM) containing a presettable target value for the transmitted power; and a transmit power controller (PCR) connected to the memory (MEM) for changing the transmitted power in response to the command (TPC) and for additionally changing the transmitted power continuously in the direction of the presettable target value (TV1).

* * * * *